(12) United States Patent
Chou

(10) Patent No.: US 9,753,243 B2
(45) Date of Patent: Sep. 5, 2017

(54) PLASTIC BARREL, OPTICAL LENS ASSEMBLY, IMAGING APPARATUS AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 86 days.

(21) Appl. No.: 14/828,704

(22) Filed: Aug. 18, 2015

(65) Prior Publication Data
US 2017/0010434 A1  Jan. 12, 2017

(30) Foreign Application Priority Data
Jul. 6, 2015 (TW) .............................. 104210894 U

(51) Int. Cl.
*G02B 7/02* (2006.01)
*G02B 13/00* (2006.01)

(52) U.S. Cl.
CPC ........... *G02B 7/021* (2013.01); *G02B 13/001* (2013.01)

(58) Field of Classification Search
CPC .......... G02B 7/02; G02B 7/021; G02B 7/022; G02B 7/023; G02B 7/14

USPC ....... 359/601, 611, 811, 819, 829, 830, 738, 359/739
See application file for complete search history.

(56) References Cited

U.S. PATENT DOCUMENTS

| 2014/0133040 A1* | 5/2014 | Tsai | ................... | G02B 7/02 359/819 |
| 2015/0062727 A1 | 3/2015 | Kang | | |
| 2015/0146093 A1* | 5/2015 | Lin | ................... | G03B 17/02 348/374 |

FOREIGN PATENT DOCUMENTS

CN           203658652 U     6/2014

* cited by examiner

Primary Examiner — Scott J Sugarman
Assistant Examiner — Robert E Tallman
(74) *Attorney, Agent, or Firm* — McClure, Qualey & Rodack, LLP

(57) ABSTRACT

A plastic barrel includes an object-end portion, an image-end portion and a tube portion. The object-end portion includes an object-end surface and an object-end hole, wherein the object-end surface includes a plurality of annular grooves, which are disposed coaxially to a central axis, and each of the annular grooves includes a stepped surface. The image-end portion includes an image-end opening. The tube portion connects the object-end portion and the image-end portion.

19 Claims, 12 Drawing Sheets

PLASTIC BARREL, OPTICAL LENS ASSEMBLY, IMAGING APPARATUS AND ELECTRONIC DEVICE

RELATED APPLICATIONS

This application claims priority to Taiwan Application Serial Number 104210894, filed Jul. 6, 2015, which is herein incorporated by reference.

BACKGROUND

Technical Field

The present disclosure relates to a plastic barrel and an optical lens assembly. More particularly, the present disclosure relates to a plastic barrel and an optical lens assembly which are applicable to portable electronic devices.

Description of Related Art

Due to the popularity of personal electronic products and mobile communication products having camera functionalities, such as smart phones and tablet personal computers, the demand for compact optical lens assemblies has been increasing and the requirements for high resolution and image quality of present compact optical lens assemblies increase significantly.

A plastic barrel is generally used to carry an optical lens assembly and provide an optical space between any two lens elements thereof. A surface property of the plastic barrel relates to an effect of suppressing unexpected lights. Accordingly, an image quality of the optical lens assembly is influenced by the surface property of the plastic barrel.

A conventional plastic barrel is typically formed by an injection molding method and has a smooth and bright surface, which is featured with high reflectivity. As a result, the conventional plastic barrel cannot suppress unexpected lights.

Another conventional plastic barrel is provided for suppressing unexpected lights. The conventional plastic barrel is atomized with a surface treatment, so that a reflectivity thereof is reduced. However, the effect of suppressing unexpected lights is still limited. Therefore, the conventional plastic barrel cannot satisfy the requirements of high-end optical systems with camera functionalities.

Given the above, how to improve the surface property of the plastic barrel for enhancing the image quality of compact optical lens assemblies has become one of the important subjects.

SUMMARY

According to one aspect of the present disclosure, a plastic barrel includes an object-end portion, an image-end portion and a tube portion. The object-end portion includes an object-end surface and an object-end hole, wherein the object-end surface includes a plurality of annular grooves, which are disposed coaxially to a central axis, and each of the annular grooves includes a stepped surface. The image-end portion includes an image-end opening. The tube portion connects the object-end portion and the image-end portion.

According to another aspect of the present disclosure, an optical lens assembly includes a plastic barrel and a lens module. The plastic barrel includes an object-end portion, an image-end portion and a tube portion. The object-end portion includes an object-end surface and an object-end hole, wherein the object-end surface includes a plurality of stepped surfaces disposed coaxially to a central axis. The image-end portion includes an image-end opening. The tube portion connects the object-end portion and the image-end portion. The lens module is disposed in the plastic barrel and includes a plurality of lens elements. When a diameter of the object-end hole is $\phi o$, the following condition is satisfied:

$$\phi o < 4.5 \text{ mm}.$$

According to another aspect of the present disclosure, an imaging apparatus includes the optical lens assembly according to the foregoing aspect.

According to another aspect of the present disclosure, an electronic device includes the imaging apparatus according to the foregoing aspect.

DETAILED DESCRIPTION

1st Embodiment

Figure 1A:
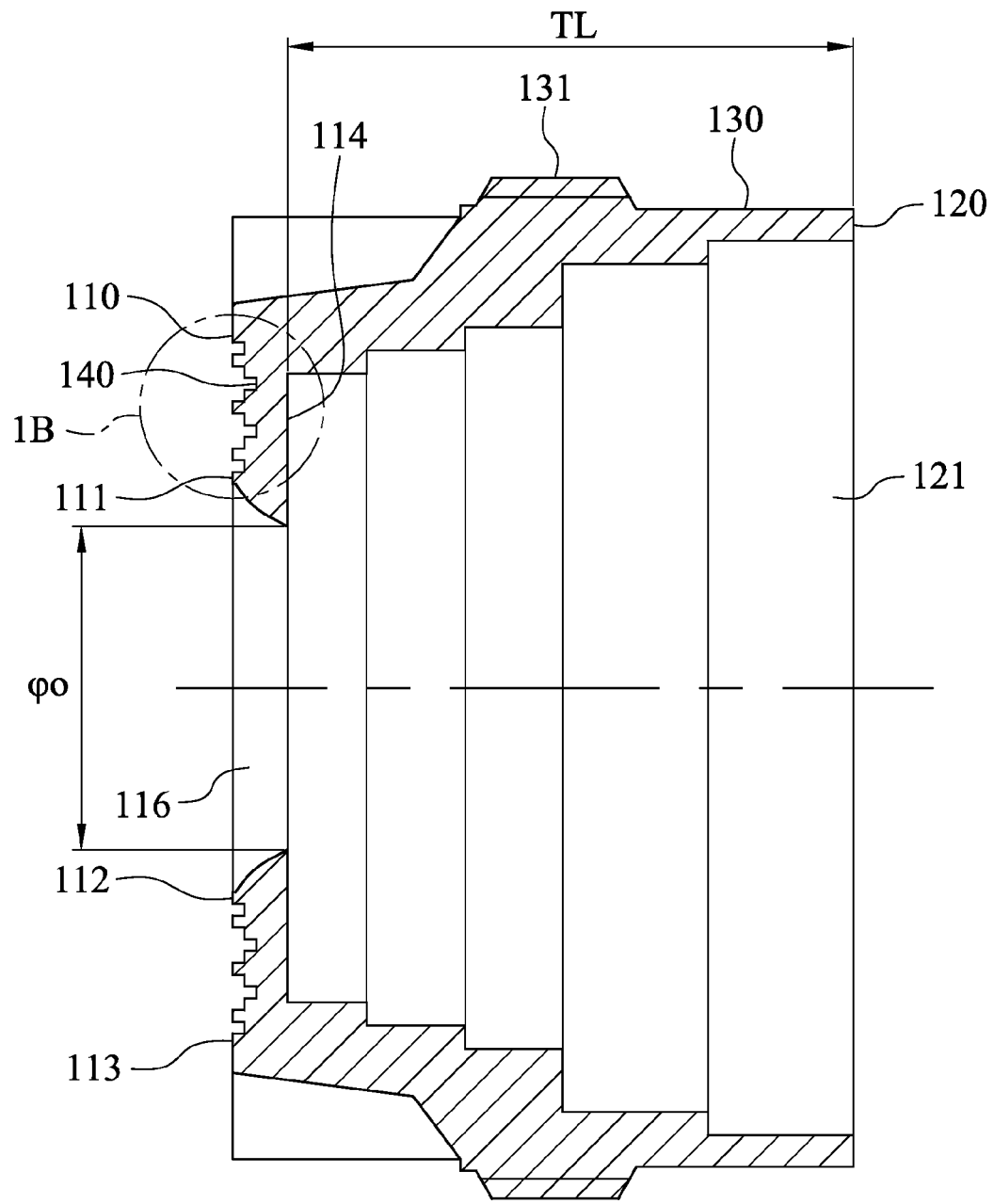
FIG. 1A is a schematic view of a plastic barrel according to the 1st embodiment of the present disclosure.

FIG. 1A is a schematic view of a plastic barrel 100 according to the 1st embodiment of the present disclosure. The plastic barrel 100 includes an object-end portion 110, an image-end portion 120 and a tube portion 130.

The object-end portion 110 includes an object-end surface 111 and an object-end hole 116, wherein the object-end hole 116 is surrounded by the object-end surface 111. The object-end surface 111 includes a plurality of annular grooves 140, which are disposed coaxially to a central axis, and each of the annular grooves 140 includes a stepped surface (its reference numeral is omitted). Therefore, it is favorable for reducing the reflected lights effectively so as to improve the image quality.

The image-end portion 120 includes an image-end opening 121. The image-end opening 121 and the object-end hole 116 are disposed on an image side and an object side along the central axis of the plastic barrel 100, respectively.

The tube portion 130 has a tubular shape along the central axis and connects the object-end portion 110 and the image-end portion 120.

In details, the annular grooves 140 and the plastic barrel 100 can be formed integrally. Therefore, it is favorable for maintaining the conveniences of manufacturing of the plastic barrel 100.

The object-end surface 111 can further include an outer object-end surface 112 and an inner object-end surface 114.

The inner object-end surface 114 is disposed opposite to the outer object-end surface 112, wherein the outer object-end surface 112 is closer to an object (not shown) than the inner object-end surface 114, and the annular grooves 140 are disposed on the outer object-end surface 112. Therefore, it is favorable for reducing the reflected lights effectively so as to improve the image quality. Furthermore, the annular grooves can be continuously disposed or can have an interval between every two of the annular grooves adjacent to each other. According to the 1st embodiment of the present disclosure, the annular grooves 140 are continuously disposed.

The outer object-end surface 112 can include an outer flat surface 113 orthogonal to the central axis. Therefore, it is favorable for obtaining a structural reference of the annular grooves 140 so as to ensure the stability in dimension.

Furthermore, the tube portion 130 can include a screw thread 131, wherein the screw thread 131 is disposed on the outer surface of the tube portion 130. Therefore, it is favorable for maintaining the stability of assembling of the plastic barrel 100 and an optical lens assembly or an actuator.

According to the 1st embodiment of the present disclosure, when a diameter of the object-end hole 116 is $\phi o$, the following condition can be satisfied: $\phi o<4.5$ mm. Therefore, it is favorable for the plastic barrel 100 applied to the optical lens assembly with compact size.

According to the 1st embodiment of the present disclosure, when a distance parallel to the central axis between the object-end hole 116 and the image-end opening 121 is TL, and the diameter of the object-end hole 116 is $\phi o$, the following condition can be satisfied: $1.35<TL/\phi o<2.75$. Therefore, it is favorable for the plastic barrel 100 applied to the optical lens assembly with high-end properties. Preferably, the following condition is satisfied: $1.50<TL/\phi o<2.25$.

According to the 1st embodiment of the present disclosure, when a number of the annular grooves 140 is M, the following condition can be satisfied: $2 \leq M \leq 8$. Therefore, it is favorable for maintaining the effects of reducing the reflected lights of the annular grooves 140.

Figure 1B:
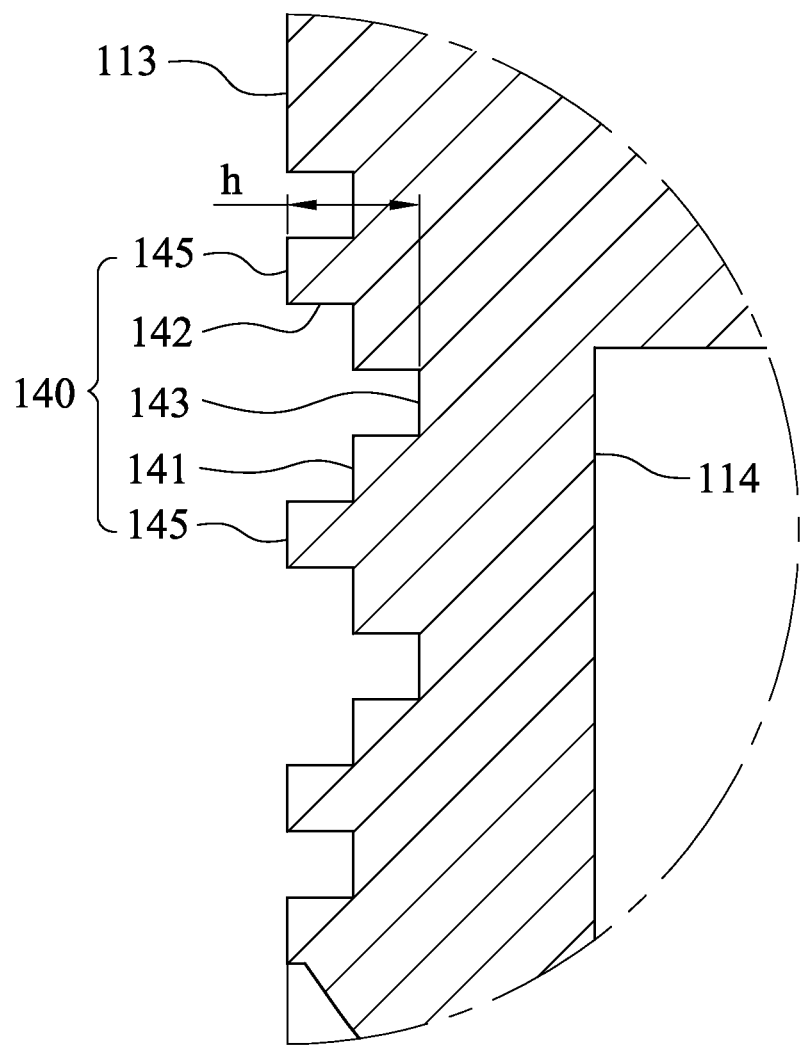
FIG. 1B is an enlarged view of part 1B in FIG. 1A.

FIG. 1B is an enlarged view of part 1B in FIG. 1A. According to the 1st embodiment of the present disclosure, the stepped surface of each of the annular grooves 140 can include a plurality of orthogonal stepped surfaces 141 and a plurality of parallel stepped surfaces 142, wherein the orthogonal stepped surfaces 141 are orthogonal to the central axis and the parallel stepped surfaces 142 are parallel to the central axis. One of the orthogonal stepped surfaces of each of the annular grooves 140 is a groove bottom 143, and each of other two of the orthogonal stepped surfaces of each of the annular grooves 140 is a groove end 145. A distance parallel to the central axis between the groove bottom 143 and the outer flat surface 113 is greatest among distances parallel to the central axis between the orthogonal stepped surfaces 141 and the outer flat surface 113. The two groove ends 145 are disposed on the other two of the orthogonal stepped surfaces located on two ends of the annular grooves 140 respectively, and a distance parallel to the central axis between each of the two groove ends 145 and the outer flat surface 113 is smaller than distances parallel to the central axis between the orthogonal stepped surfaces 141 adjacent to thereof and the outer flat surface 113. That is, the distance parallel to the central axis between each of the two groove ends 145 and the outer flat surface 113 is smaller than distances parallel to the central axis between the orthogonal stepped surfaces 141 adjacent to thereof and the outer flat surface 113, so each of the two groove ends 145 is the boundary of two annular grooves 140 adjacent to each other. In the 1st embodiment, the annular grooves 140 are continuously disposed. Hence, the boundary between two annular grooves 140, which are adjacent to each other, is the same one of the groove ends 145 (the same one of the orthogonal stepped surfaces), wherein the foregoing one of the groove ends 145 is one of the orthogonal stepped surfaces included in two annular grooves 140 which are adjacent to each other. When a number of the orthogonal stepped surfaces 141 of at least one of the annular grooves 140 is N, the following condition can be satisfied: $4 \leq N \leq 8$. Therefore, it is favorable for maintaining the effects of reducing the reflected lights of the stepped surfaces of the annular grooves 140.

Furthermore, when a sum of the orthogonal stepped surfaces 141 of each of the annular grooves 140 is $\Sigma N$, the following condition can be satisfied: $7 \leq \Sigma N$. Therefore, it is favorable for maintaining the effects of reducing the reflected lights of the stepped surfaces of the annular grooves 140.

According to the 1st embodiment of the present disclosure, when the distance parallel to the central axis between one of the two groove ends 145 and the outer flat surface 113 is smaller than the distance parallel to the central axis between the other one of the two groove ends 145 and the outer flat surface 113, and a distance parallel to the central axis between the one of the two groove ends 145 and the groove bottom 143 is h, the following condition can be satisfied: $0.02$ mm$<h<0.25$ mm. Therefore, it is favorable for obtaining a significant surface structure of the annular grooves 140 so as to reduce the reflected lights effectively and improve the image quality.

The data of the aforementioned parameters of the plastic barrel 100 according to the 1st embodiment of the present disclosure are listed in the following Table 1. According to the 1st embodiment, a number of the main annular grooves 140 which respectively have 4 to 8 orthogonal stepped surfaces 141 is M, the number of the orthogonal stepped surfaces 141 of the annular grooves 140 aforementioned is N, and the parameter h is listed in Table 1. The sum of the orthogonal stepped surfaces 141 of each of the annular grooves 140 of the plastic barrel 100 is $\Sigma N$. The data are also shown as FIG. 1A and FIG. 1B.

TABLE 1

| 1st Embodiment | | | |
|---|---|---|---|
| $\phi o$ (mm) | 2.06 | N | 5 |
| TL (mm) | 3.60 | h (mm) | 0.15 |
| TL/$\phi o$ | 1.75 | $\Sigma N$ | 9 |
| M | 2 | | |

2nd Embodiment

Figure 2A:
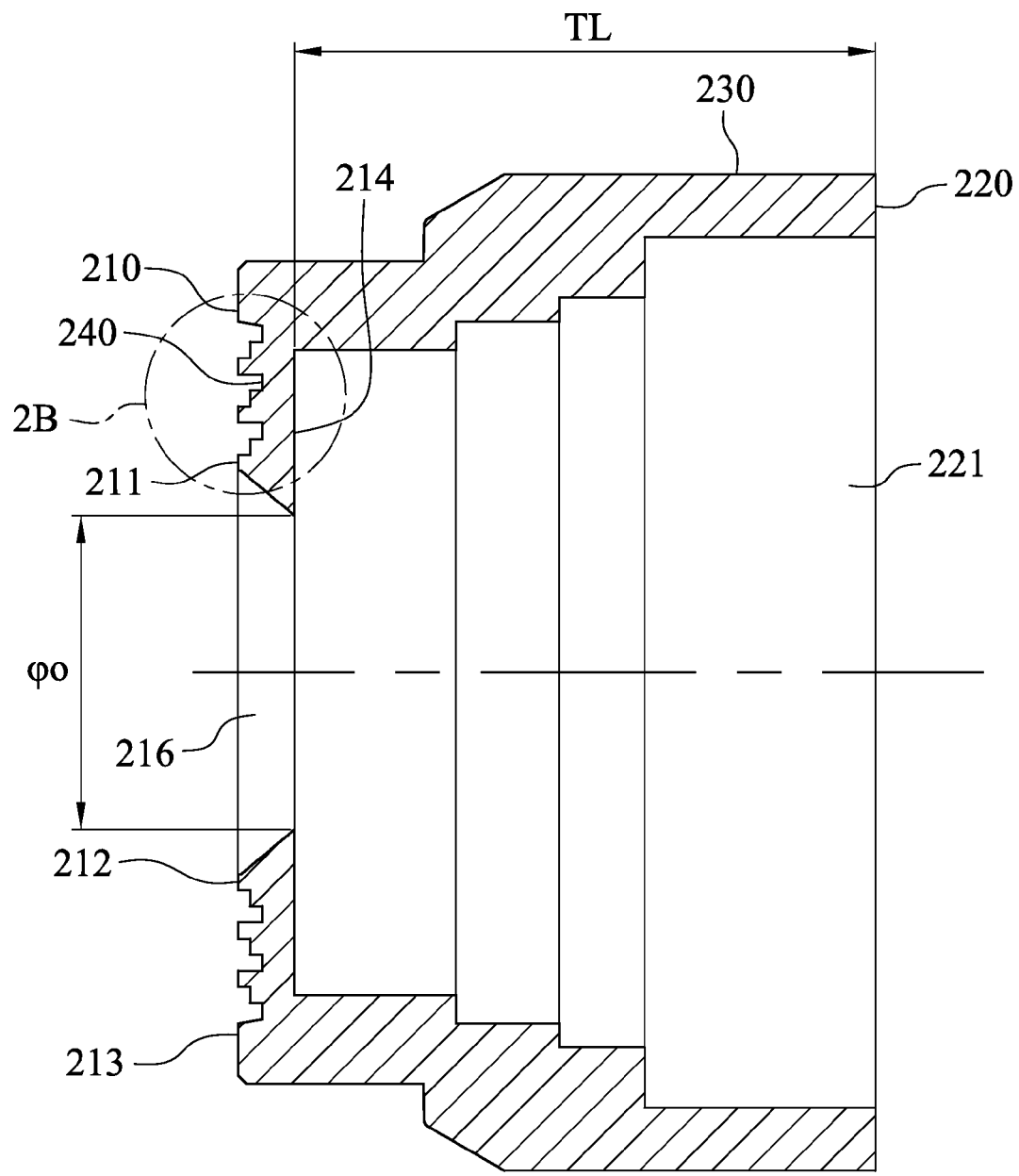
FIG. 2A is a schematic view of a plastic barrel according to the 2nd embodiment of the present disclosure.

FIG. 2A is a schematic view of a plastic barrel 200 according to the 2nd embodiment of the present disclosure. The plastic barrel 200 includes an object-end portion 210, an image-end portion 220 and a tube portion 230.

The object-end portion 210 includes an object-end surface 211 and an object-end hole 216, wherein the object-end hole 216 is surrounded by the object-end surface 211. The object-end surface 211 includes a plurality of annular grooves 240, which are disposed coaxially to a central axis, and each of the annular grooves 240 includes a stepped surface (its reference numeral is omitted).

The object-end surface 211 further includes an outer object-end surface 212 and an inner object-end surface 214.

The inner object-end surface 214 is disposed opposite to the outer object-end surface 212, wherein the outer object-end surface 212 is closer to an object (not shown) than the inner object-end surface 214, the outer object-end surface 212 includes an outer flat surface 213 orthogonal to the central axis, and the annular grooves 240 are disposed on the outer object-end surface 212. Furthermore, the annular grooves 240 and the plastic barrel 200 are formed integrally.

The image-end portion 220 includes an image-end opening 221. The image-end opening 221 and the object-end hole 216 are disposed on an image side and an object side along the central axis of the plastic barrel 200, respectively. The tube portion 230 has a tubular shape along the central axis and connects the object-end portion 210 and the image-end portion 220.

Figure 2B:
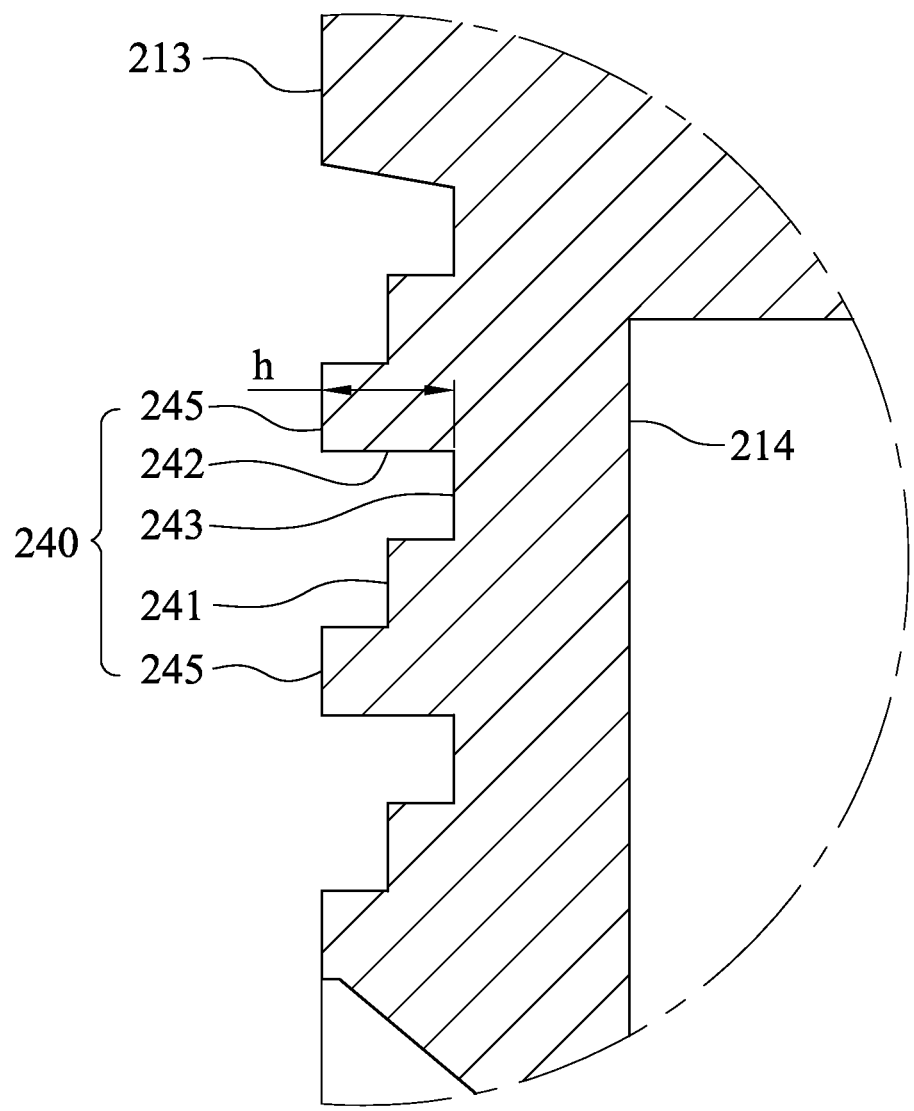
FIG. 2B is an enlarged view of part 2B in FIG. 2A.

FIG. 2B is an enlarged view of part 2B in FIG. 2A. According to the 2nd embodiment of the present disclosure, the stepped surface of each of the annular grooves 240 includes a plurality of orthogonal stepped surfaces 241 and a plurality of parallel stepped surfaces 242, wherein the orthogonal stepped surfaces 241 are orthogonal to the central axis and the parallel stepped surfaces 242 are parallel to the central axis. One of the orthogonal stepped surfaces of each of the annular grooves 240 is a groove bottom 243, and each of other two of the orthogonal stepped surfaces of each of the annular grooves 240 is a groove end 245. A distance parallel to the central axis between the groove bottom 243 and the outer flat surface 213 is greatest among distances parallel to the central axis between the orthogonal stepped surfaces 241 and the outer flat surface 213. The two groove ends 245 are disposed on the other two of the orthogonal stepped surfaces located on two ends of the annular grooves 240 respectively.

The data of the parameters φ, TL, TL/φo, M, N, h and ΣN of the plastic barrel 200 according to the 2nd embodiment of the present disclosure are listed in the following Table 2. The definitions of these parameters shown in Table 2 are the same as those stated in the 1st embodiment with corresponding values for the 2nd embodiment. According to the 2nd embodiment, a number of the main annular grooves 240 which respectively have 4 to 8 orthogonal stepped surfaces 241 is M, the number of the orthogonal stepped surfaces 241 of the annular grooves 240 aforementioned is N, and the parameter h is listed in Table 2. The sum of the orthogonal stepped surfaces 241 of each of the annular grooves 240 of the plastic barrel 200 is ΣN. The data are also shown as FIG. 2A and FIG. 2B.

TABLE 2

| 2nd Embodiment | | | |
|---|---|---|---|
| φo (mm) | 1.95 | N | 4 |
| TL (mm) | 3.60 | h (mm) | 0.15 |
| TL/φo | 1.85 | ΣN | 10 |
| M | 3 | | |

3rd Embodiment

Figure 3A:
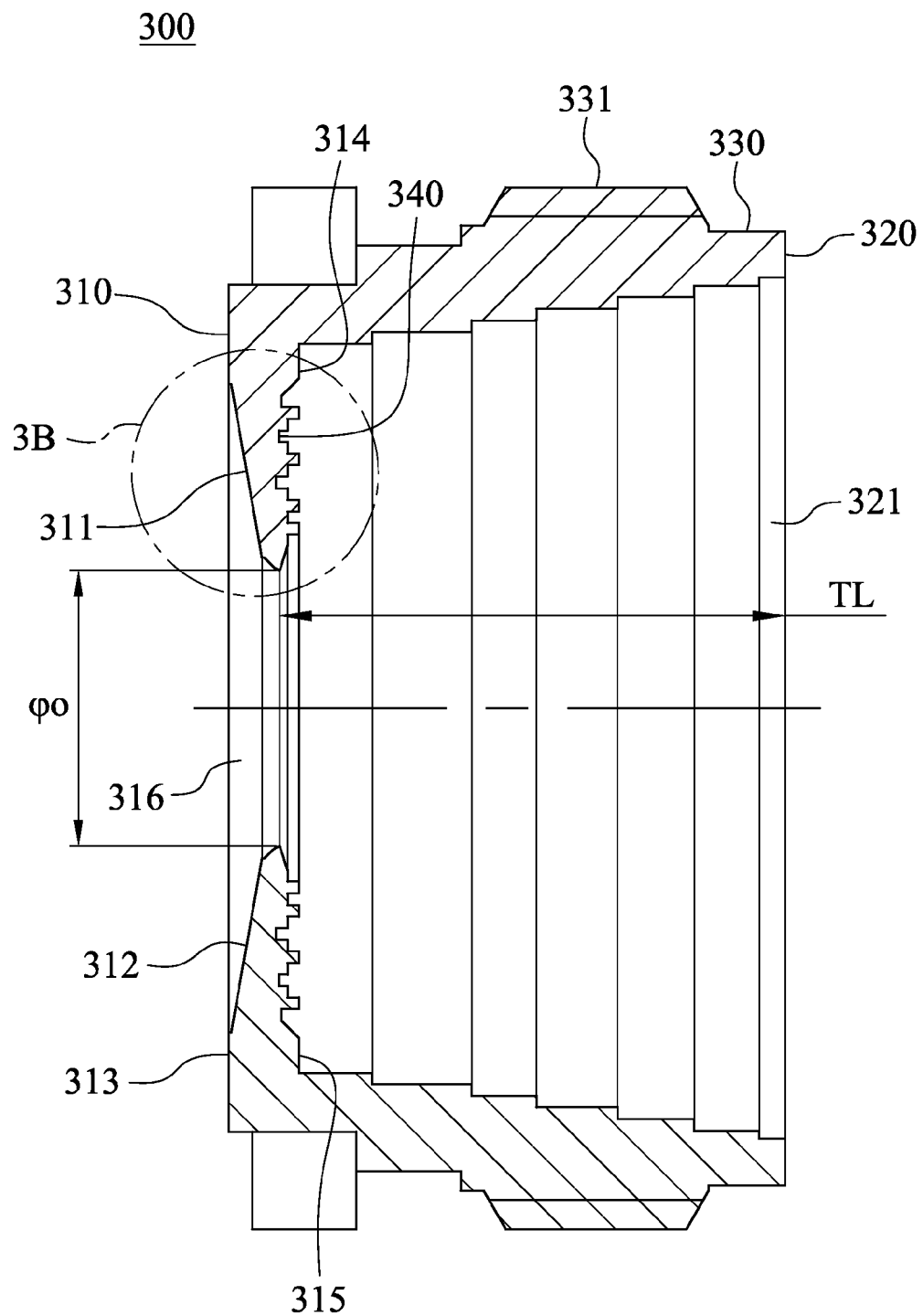
FIG. 3A is a schematic view of a plastic barrel according to the 3rd embodiment of the present disclosure.

FIG. 3A is a schematic view of a plastic barrel 300 according to the 3rd embodiment of the present disclosure. The plastic barrel 300 includes an object-end portion 310, an image-end portion 320 and a tube portion 330.

The object-end portion 310 includes an object-end surface 311 and an object-end hole 316, wherein the object-end hole 316 is surrounded by the object-end surface 311. The object-end surface 311 includes a plurality of annular grooves 340, which are disposed coaxially to a central axis, and each of the annular grooves 340 includes a stepped surface (its reference numeral is omitted).

The object-end surface 311 further includes an outer object-end surface 312 and an inner object-end surface 314. The inner object-end surface 314 is disposed opposite to the outer object-end surface 312, wherein the outer object-end surface 312 is closer to an object (not shown) than the inner object-end surface 314, and the annular grooves 340 are disposed on the inner object-end surface 314. Therefore, it is favorable for reducing the reflected lights effectively so as to improve the image quality. Furthermore, the annular grooves can be continuously disposed or can have an interval between every two of the annular grooves adjacent to each other. According to the 3rd embodiment of the present disclosure, the annular grooves 340 are continuously disposed.

The annular grooves 340 and the plastic barrel 300 are formed integrally. The outer object-end surface 312 includes an outer flat surface 313 orthogonal to the central axis.

Moreover, the outer object-end surface 312 can further include an inner flat surface 315 orthogonal to the central axis. Therefore, it is favorable for obtaining a structural reference of the annular grooves 340 so as to ensure the stability in dimension.

The image-end portion 320 includes an image-end opening 321. The image-end opening 321 and the object-end hole 316 are disposed on an image side and an object side along the central axis of the plastic barrel 300, respectively. The tube portion 330 includes a screw thread 331, wherein the screw thread 331 is disposed on the outer surface of the tube portion 330.

Figure 3B:
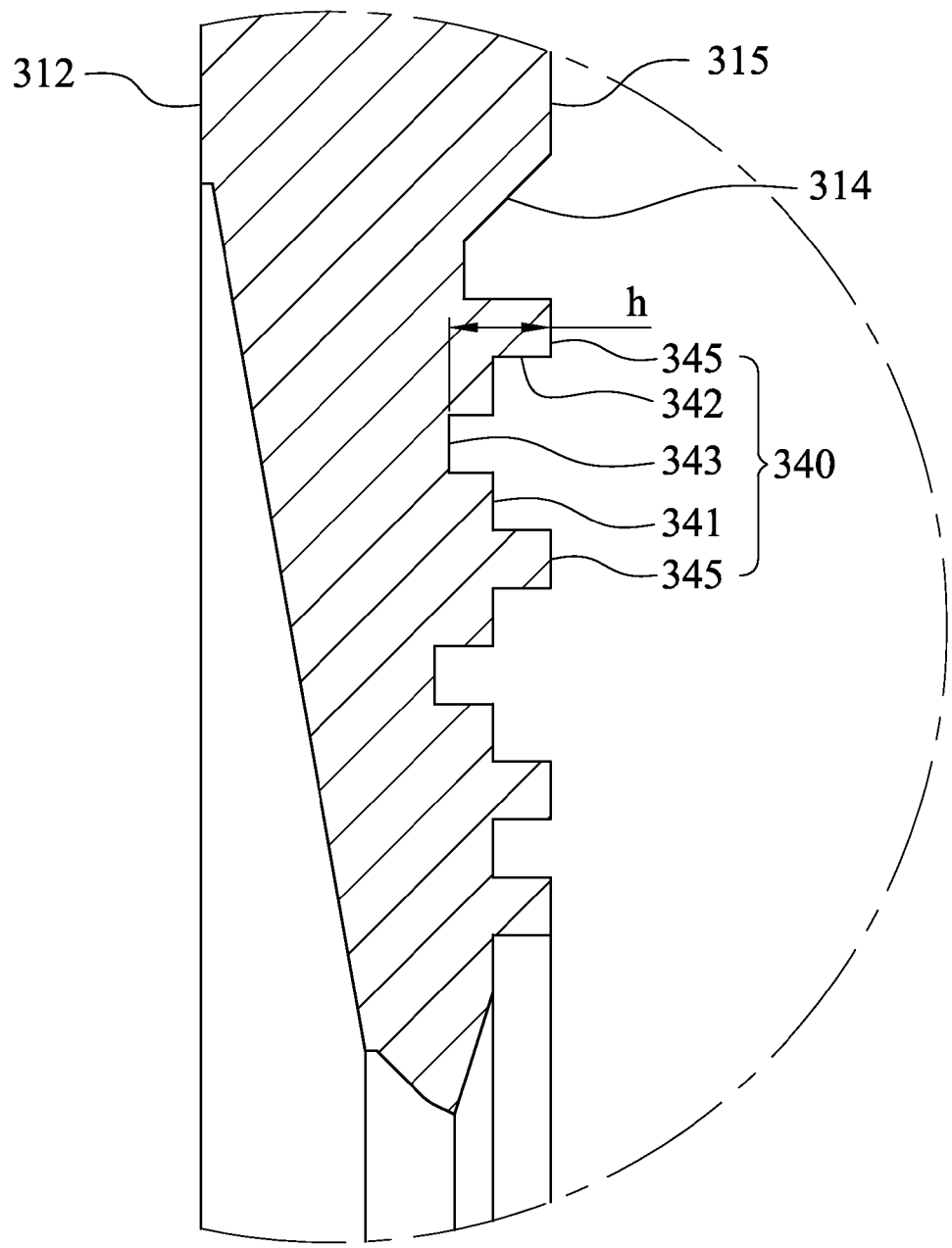
FIG. 3B is an enlarged view of part 3B in FIG. 3A.

FIG. 3B is an enlarged view of part 3B in FIG. 3A. According to the 3rd embodiment of the present disclosure, the stepped surface of each of the annular grooves 340 can include a plurality of orthogonal stepped surfaces 341 and a plurality of parallel stepped surfaces 342, wherein the orthogonal stepped surfaces 341 are orthogonal to the central axis and the parallel stepped surfaces 342 are parallel to the central axis. One of the orthogonal stepped surfaces of each of the annular grooves 340 is a groove bottom 343, and each of other two of the orthogonal stepped surfaces of each of the annular grooves 340 is a groove end 345. A distance parallel to the central axis between the groove bottom 343 and the inner flat surface 315 is greatest among distances parallel to the central axis between the orthogonal stepped surfaces 341 and the inner flat surface 315. The two groove ends 345 are disposed on the other two of the orthogonal stepped surfaces located on two ends of the annular grooves 340 respectively, and a distance parallel to the central axis between each of the two groove ends 345 and the inner flat surface 315 is smaller than distances parallel to the central axis between the orthogonal stepped surfaces 341 adjacent to thereof and the inner flat surface 315. That is, the distance parallel to the central axis between each of the two groove ends 345 and the inner flat surface 315 is smaller than distances parallel to the central axis between the orthogonal stepped surfaces 341 adjacent to thereof and the inner flat surface 315, so each of the two groove ends 345 is the boundary of two annular grooves 340 adjacent to each other. In the 3rd embodiment, the annular grooves 340 are continuously disposed. Hence, the boundary between two annular grooves 340, which are adjacent to each other, is the same one of the groove ends 345 (the same one of the orthogonal stepped surfaces), wherein the foregoing one of the groove ends 345 is one of the orthogonal stepped surfaces included in two annular grooves 340 which are adjacent to each other.

According to the 3rd embodiment of the present disclosure, when the distance parallel to the central axis between one of the two groove ends 345 and the inner flat surface 315 is smaller than the distance parallel to the central axis between the other one of the two groove ends 345 and the inner flat surface 315, and a distance parallel to the central axis between the one of the two groove ends 345 and the groove bottom 343 is h, the following condition can be satisfied: 0.02 mm<h<0.25 mm. Therefore, it is favorable for obtaining a significant surface structure of the annular grooves 340 so as to reduce the reflected lights effectively and improve the image quality.

The data of the parameters φ, TL, TL/φo, M, N, h and ΣN of the plastic barrel 300 according to the 3rd embodiment of the present disclosure are listed in the following Table 3. The definition of parameter h is as above, and the definitions of other parameters shown in Table 3 are the same as those stated in the 1st embodiment with corresponding values for the 3rd embodiment. According to the 3rd embodiment, a number of the main annular grooves 340 which respectively have 4 to 8 orthogonal stepped surfaces 341 is M, the number of the orthogonal stepped surfaces 341 of the annular grooves 340 aforementioned is N, and the parameter h is listed in Table 3. The sum of the orthogonal stepped surfaces 341 of each of the annular grooves 340 of the plastic barrel 300 is ΣN. The data are also shown as FIG. 3A and FIG. 3B.

TABLE 3

| 3rd Embodiment | | | |
|---|---|---|---|
| φo (mm) | 1.19 | N | 5 |
| TL (mm) | 2.18 | h (mm) | 0.10 |
| TL/φo | 1.83 | ΣN | 9 |
| M | 2 | | |

4th Embodiment

Figure 4A:
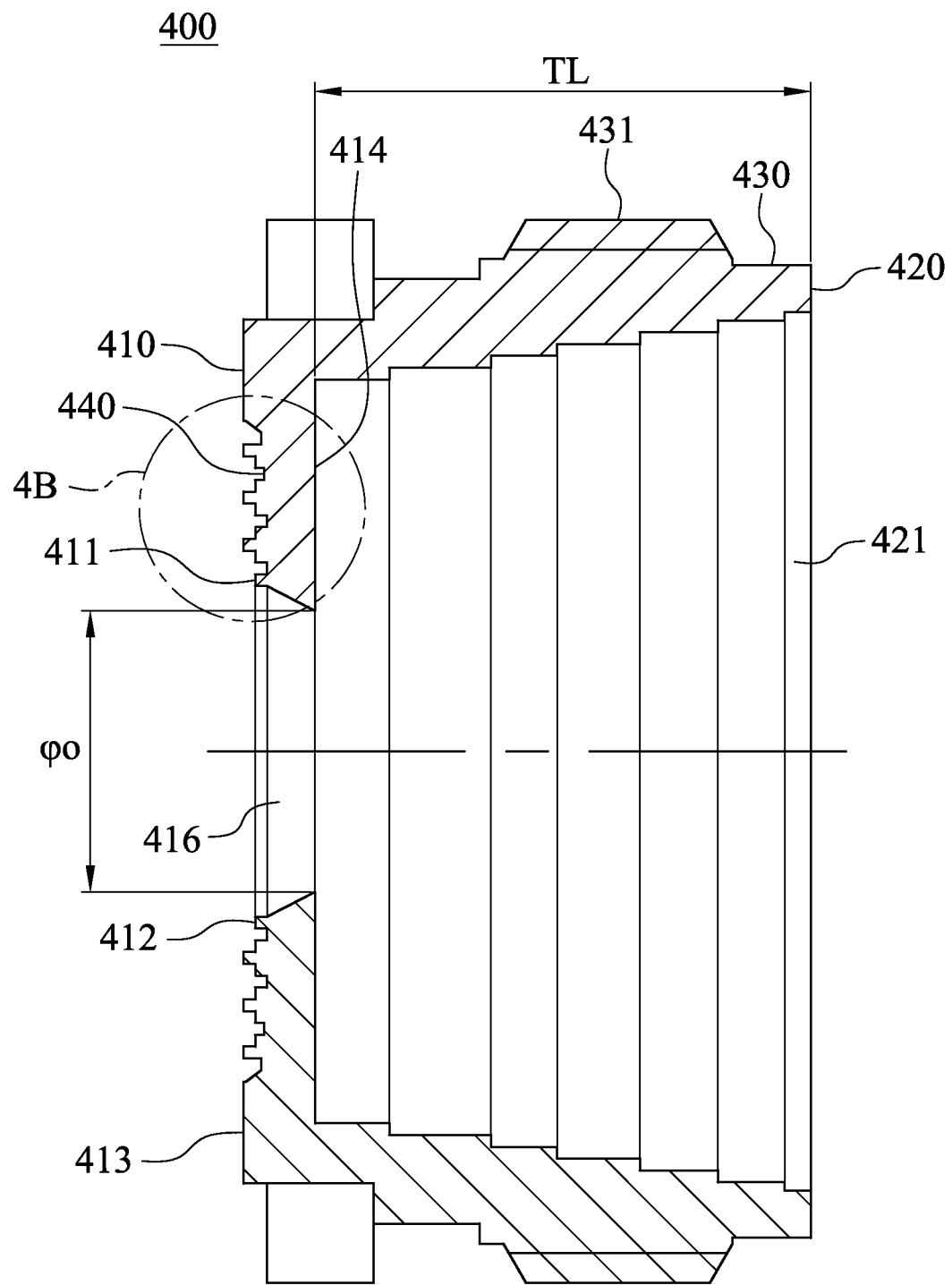
FIG. 4A is a schematic view of a plastic barrel according to the 4th embodiment of the present disclosure.

FIG. 4A is a schematic view of a plastic barrel 400 according to the 4th embodiment of the present disclosure. The plastic barrel 400 includes an object-end portion 410, an image-end portion 420 and a tube portion 430.

The object-end portion 410 includes an object-end surface 411 and an object-end hole 416, wherein the object-end hole 416 is surrounded by the object-end surface 411. The object-end surface 411 includes a plurality of annular grooves 440, which are disposed coaxially to a central axis, and each of the annular grooves 440 includes a stepped surface (its reference numeral is omitted).

The object-end surface 411 further includes an outer object-end surface 412 and an inner object-end surface 414. The inner object-end surface 414 is disposed opposite to the outer object-end surface 412, wherein the outer object-end surface 412 is closer to an object (not shown) than the inner object-end surface 414, the outer object-end surface 412 includes an outer flat surface 413 orthogonal to the central axis, and the annular grooves 440 are disposed on the outer object-end surface 412. Furthermore, the annular grooves 440 and the plastic barrel 400 are formed integrally.

The image-end portion 420 includes an image-end opening 421. The image-end opening 421 and the object-end hole 416 are disposed on an image side and an object side along the central axis of the plastic barrel 400, respectively. The tube portion 430 has a tubular shape along the central axis and connects the object-end portion 410 and the image-end portion 420. Moreover, the tube portion 430 includes a screw thread 431, wherein the screw thread 431 is disposed on the outer surface of the tube portion 430.

Figure 4B:
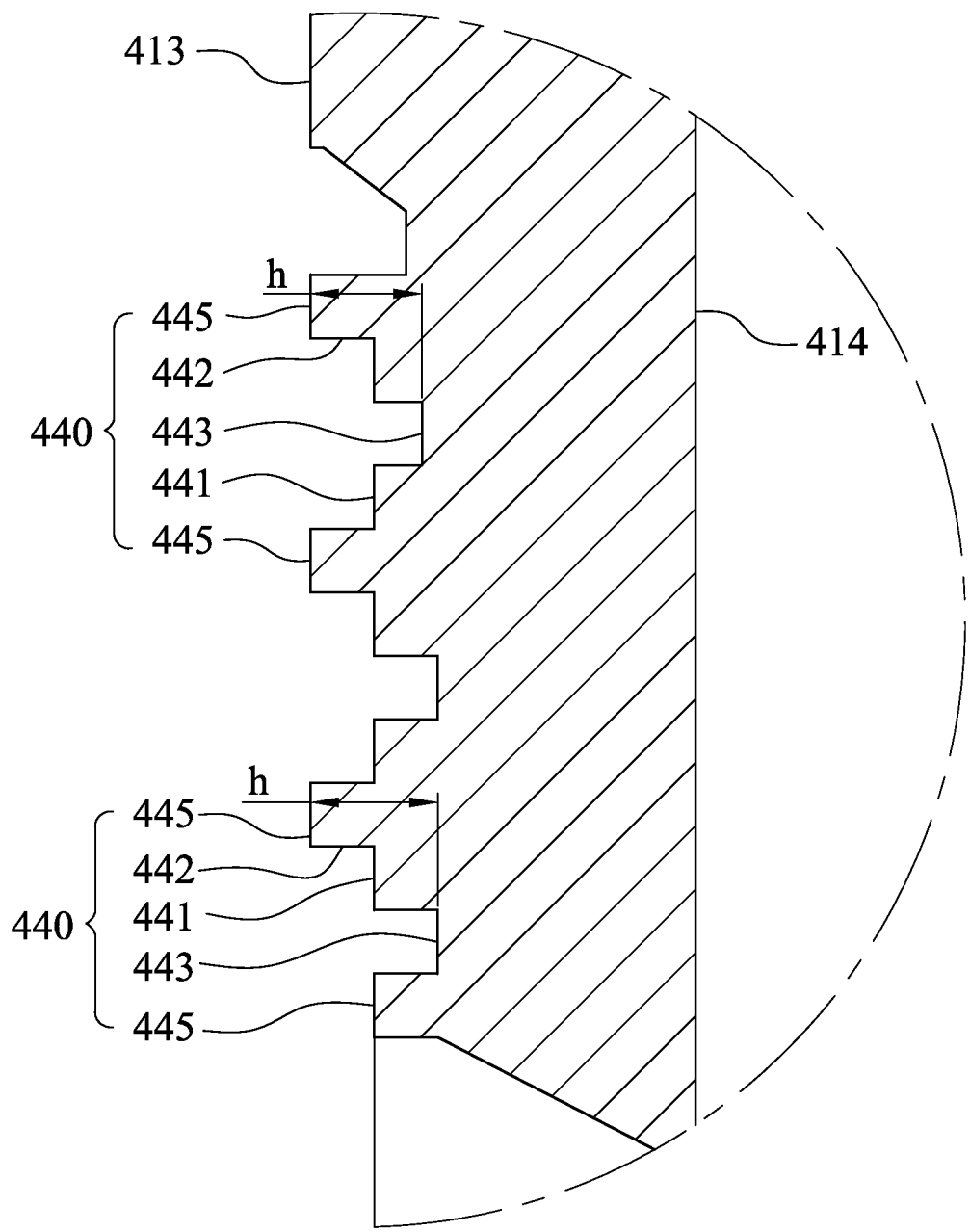
FIG. 4B is an enlarged view of part 4B in FIG. 4A.

FIG. 4B is an enlarged view of part 4B in FIG. 4A. According to the 4th embodiment of the present disclosure, the stepped surface of each of the annular grooves 440 includes a plurality of orthogonal stepped surfaces 441 and a plurality of parallel stepped surfaces 442, wherein the orthogonal stepped surfaces 441 are orthogonal to the central axis and the parallel stepped surfaces 442 are parallel to the central axis. One of the orthogonal stepped surfaces of each of the annular grooves 440 is a groove bottom 443, and each of other two of the orthogonal stepped surfaces of each of the annular grooves 440 is a groove end 445. A distance parallel to the central axis between the groove bottom 443 and the outer flat surface 413 is greatest among distances parallel to the central axis between the orthogonal stepped surfaces 441 and the outer flat surface 413. The two groove ends 445 are disposed on the other two of the orthogonal stepped surfaces located on two ends of the annular grooves 440 respectively.

The data of the parameters φ, TL, TL/φo, M, N, h and ΣN of the plastic barrel 400 according to the 4th embodiment of the present disclosure are listed in the following Table 4. The definitions of these parameters shown in Table 4 are the same as those stated in the 1st embodiment with corresponding values for the 4th embodiment. According to the 4th embodiment, a number of the main annular grooves 440 which respectively have 4 to 8 orthogonal stepped surfaces 441 is M, the number of the orthogonal stepped surfaces 441 of the annular grooves 440 aforementioned is N, the number of the annular grooves 440 (M) which respectively have 5 orthogonal stepped surfaces 441 (N) is 2, the number of the annular grooves 440 (M) which respectively have 4 orthogonal stepped surfaces 441 (N) is 1, and the parameter h is listed in Table 4. The sum of the orthogonal stepped surfaces 441 of each of the annular grooves 440 of the plastic barrel 400 is ΣN. The data are also shown as FIG. 4A and FIG. 4B.

TABLE 4

| 4th Embodiment | | | | |
|---|---|---|---|---|
| φo (mm) | 1.19 | N | 5 | 4 |
| TL (mm) | 2.10 | h (mm) | 0.10 | |
| TL/φo | 1.76 | ΣN | 12 | |
| M | 3 | | | |

5th Embodiment

Figure 5:
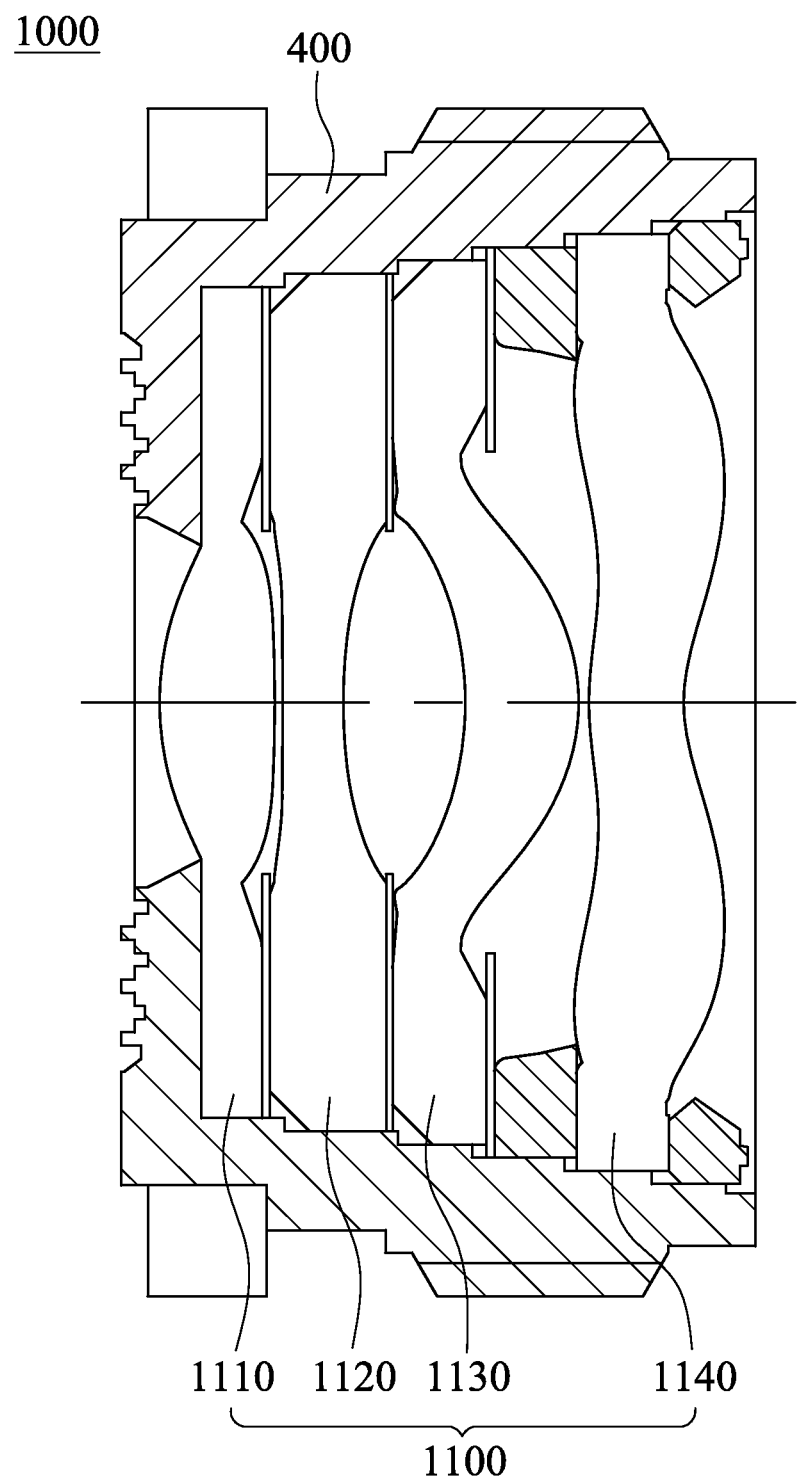
FIG. 5 shows an optical lens assembly according to the 5th embodiment of the present disclosure.

FIG. 5 shows an optical lens assembly 1000 according to the 5th embodiment of the present disclosure. The optical lens assembly 1000 includes the plastic barrel 400 and a lens module 1100.

The lens module 1100 is disposed in the plastic barrel 400 and includes a plurality of lens elements (1110-1140).

In FIG. 4A and FIG. 4B, the plastic barrel 400 includes the object-end portion 410, the image-end portion 420 and the tube portion 430. The object-end portion 410 includes the object-end surface 411 and the object-end hole 416, wherein the object-end hole 416 is surrounded by the object-end surface 411, and the object-end surface 411 includes a plurality of stepped surface (its reference numeral is omitted) disposed coaxially to the central axis. Therefore, it is favorable for reducing the reflected lights effectively so as to improve the image quality.

The image-end portion 420 includes the image-end opening 421. The image-end opening 421 and the object-end hole 416 are disposed on the image side and the object side along the central axis of plastic barrel 400, respectively. The tube portion 430 has the tubular shape along the central axis and connects the object-end portion 410 and the image-end portion 420. The other details of the plastic barrel 400 have been described in the foregoing paragraphs and will not be repeated herein.

According to the 5th embodiment of the present disclosure, when the diameter of the object-end hole 416 of the plastic barrel 400 is φo, the following condition is satisfied: φo<4.5 mm. Therefore, it is favorable for the plastic barrel 400 to be applied to the optical lens assembly 1000 with compact size.

In details, the lens module 1100 includes, in order from the object-end portion 410 of the plastic barrel 400 to the image-end portion 420 thereof, the first lens element 1110, the second lens element 1120, the third lens element 1130 and the fourth lens element 1140, wherein the lens elements 1110-1140 are respectively abutted with a plurality of optical elements (its reference numeral is omitted) so as to be disposed in the plastic barrel 400.

Furthermore, the plastic barrel 400 can be formed by an injection molding method. Therefore, it is favorable for mass production.

The object-end hole 416 of the plastic barrel 400 can be an aperture stop of the optical lens assembly 1000. Therefore, it is favorable for reducing the complexity of mechanism design.

According to the 5th embodiment of the present disclosure, when the distance parallel to the central axis between the object-end hole 416 and the image-end opening 421 is TL, and the diameter of the object-end hole 416 is φo, the following condition can be satisfied: 1.35<TL/φo<2.75. Therefore, it is favorable for the plastic barrel 400 applied to the optical lens assembly 1000 with high-end properties. Preferably, the following condition is satisfied: 1.50<TL/φo<2.25.

According to the 5th embodiment of the present disclosure, one of the stepped surfaces can form one of the annular grooves 440, when a number of the annular grooves 440 is M, the following condition can be satisfied: 1≤M≤8. Therefore, it is favorable for maintaining the effects of reducing the reflected lights of the stepped surfaces.

Furthermore, one of the stepped surfaces can form one of the annular grooves or other structure. The stepped surfaces can be orthogonal to the central axis, parallel to the central axis or neither of the above, such as sawtooth shape.

The data of the aforementioned parameters of the optical lens assembly 1000 according to the 5th embodiment of the present disclosure are listed in the following Table 5, wherein the number of the main ones of the annular grooves 440 of the plastic barrel 400 is M, and the data are also shown as FIG. 4A and FIG. 4B.

TABLE 5

5th Embodiment

| φo (mm) | 1.19 | TL/φo | 1.76 |
|---|---|---|---|
| TL (mm) | 2.10 | M | 3 |

6th Embodiment

Figure 6:
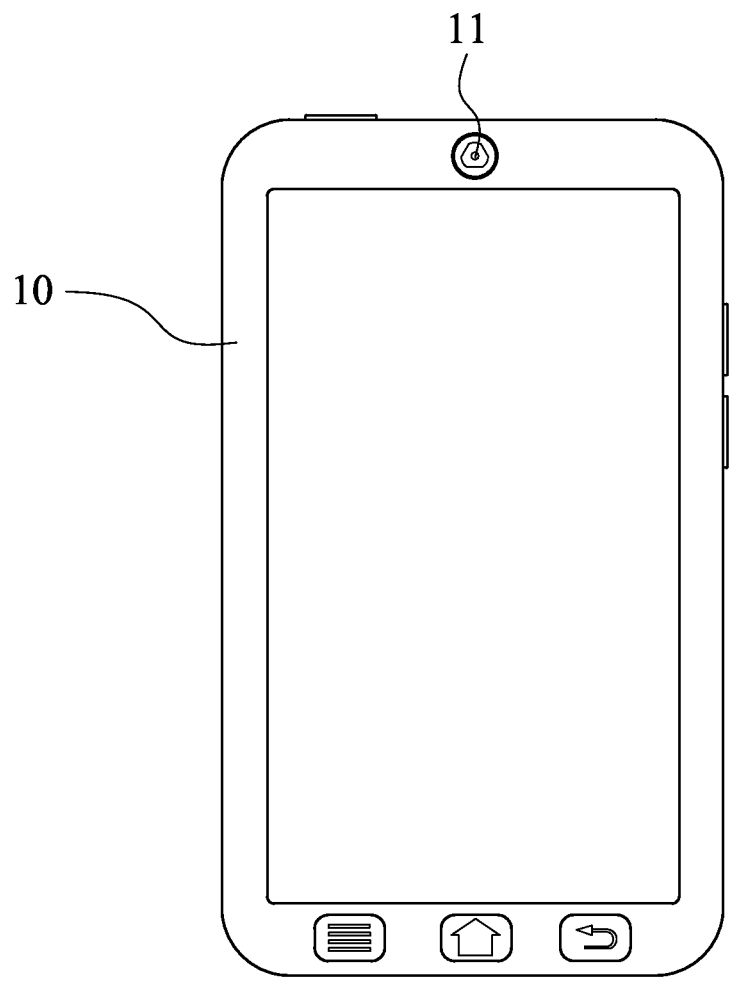
FIG. 6 shows an electronic device according to the 6th embodiment of the present disclosure.

FIG. 6 shows an electronic device 10 according to the 6th embodiment of the present disclosure. The electronic device 10 of the 6th embodiment is a smart phone, wherein the electronic device 10 includes an imaging apparatus 11, the imaging apparatus 11 includes an optical lens assembly (not shown) according to the present disclosure, and the optical lens assembly includes an plastic barrel (not shown) according to the present disclosure. Therefore, it is favorable for reducing the reflected lights effectively and improving the image quality so as to satisfy the requirements of high-end electronic devices with camera functionalities. Furthermore, the imaging apparatus 11 can further include an image sensor disposed on or near an image surface of the optical lens assembly. Preferably, the electronic device 10 can further include but not limited to a display, a control unit, a storage unit, a random access memory unit (RAM), a read-only memory unit (ROM) or a combination thereof.

7th Embodiment

Figure 7:
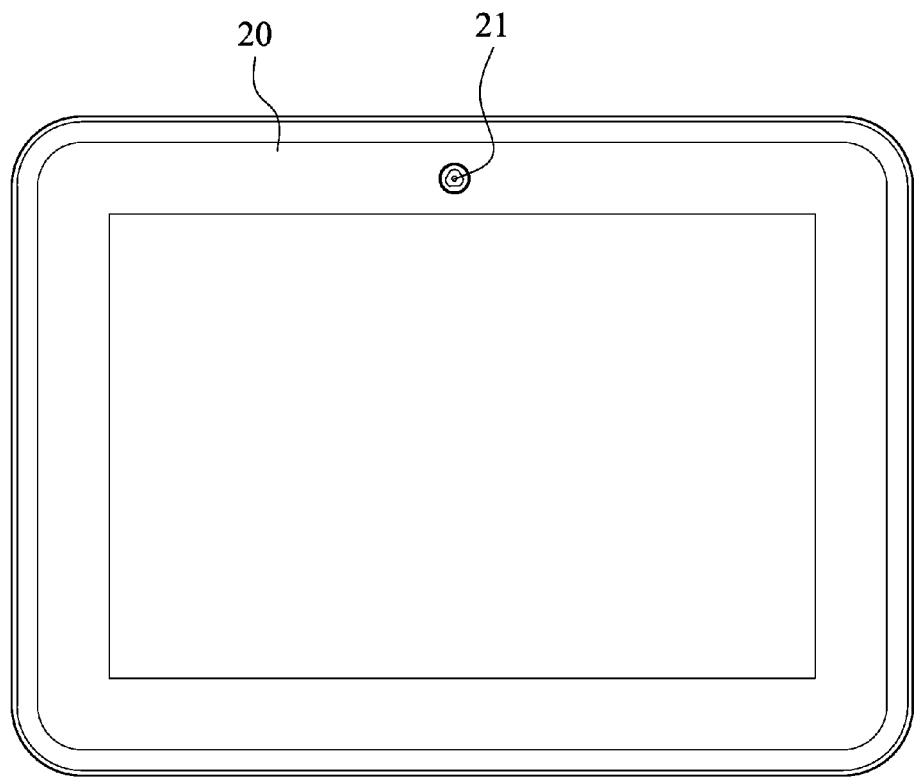
FIG. 7 shows an electronic device according to the 7th embodiment of the present disclosure.

FIG. 7 shows an electronic device 20 according to the 7th embodiment of the present disclosure. The electronic device 20 of the 7th embodiment is a tablet personal computer, wherein the electronic device 20 includes an imaging apparatus 21, the imaging apparatus 21 includes an optical lens assembly (not shown) according to the present disclosure, and the optical lens assembly includes an plastic barrel (not shown) according to the present disclosure.

8th Embodiment

Figure 8:
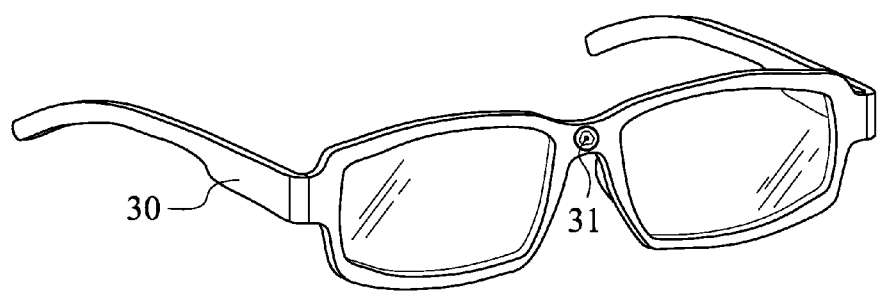
FIG. 8 shows an electronic device according to the 8th embodiment of the present disclosure.

FIG. 8 shows an electronic device 30 according to the 8th embodiment of the present disclosure. The electronic device 30 of the 8th embodiment is a head-mounted display, wherein the electronic device 30 includes an imaging apparatus 31, the imaging apparatus 31 includes an optical lens assembly (not shown) according to the present disclosure, and the optical lens assembly includes an plastic barrel (not shown) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A plastic barrel, comprising:
an object-end portion comprising an object-end surface and an object-end hole, wherein the object-end surface comprises a plurality of annular grooves, which are disposed coaxially to a central axis, each of the annular grooves comprises a stepped surface, and the stepped surface of each of the annular grooves comprises a plurality of orthogonal stepped surfaces orthogonal to the central axis;
an image-end portion comprising an image-end opening; and
a tube portion connecting the object-end portion and the image-end portion;
wherein a sum of the orthogonal stepped surfaces of every of the stepped surfaces is ΣN, and the following condition is satisfied:

7≤ΣN.

2. The plastic barrel of claim 1, wherein the annular grooves and the plastic barrel are formed integrally.

3. The plastic barrel of claim 2, wherein the object-end surface further comprises:
an outer object-end surface; and
an inner object-end surface disposed opposite to the outer object-end surface, wherein the outer object-end surface is closer to an object than the inner object-end surface;
wherein the annular grooves are disposed on the outer object-end surface.

4. The plastic barrel of claim 2, wherein a number of the orthogonal stepped surfaces of at least one of the annular grooves is N, and the following condition is satisfied:

4≤N≤8.

5. The plastic barrel of claim 2, wherein a number of the annular grooves is M, and the following condition is satisfied:

2≤M≤8.

6. The plastic barrel of claim 2, wherein a diameter of the object-end hole is φo, and the following condition is satisfied:

φo<4.5 mm.

7. The plastic barrel of claim 3, wherein the outer object-end surface comprises an outer flat surface orthogonal to the central axis.

8. The plastic barrel of claim 3, wherein one of the orthogonal stepped surfaces is a groove bottom, each of another two of the orthogonal stepped surfaces is a groove end, and the outer object-end surface comprises an outer flat surface orthogonal to the central axis;
wherein a distance parallel to the central axis between the groove bottom and the outer flat surface is greatest among distances parallel to the central axis between the orthogonal stepped surfaces and the outer flat surface, the two groove ends are disposed on two ends of the annular grooves respectively, and a distance parallel to the central axis between each of the two groove ends and the outer flat surface is smaller than distances parallel to the central axis between the orthogonal stepped surfaces adjacent to thereof and the outer flat surface;
wherein the distance parallel to the central axis between one of the two groove ends and the outer flat surface is smaller than the distance parallel to the central axis between the other one of the two groove ends and the outer flat surface, a distance parallel to the central axis between the one of the two groove ends and the groove bottom is h, and the following condition is satisfied:

0.02 mm<h<0.25 mm.

9. The plastic barrel of claim 1, wherein a distance parallel to the central axis between the object-end hole and the image-end opening is TL, a diameter of the object-end hole is φo, and the following condition is satisfied:

1.35<TL/φo<2.75.12.

10. The plastic barrel of claim 9, wherein the distance parallel to the central axis between the object-end hole and the image-end opening is TL, the diameter of the object-end hole is φo, and the following condition is satisfied:

1.50<TL/φo<2.25.14.

11. The plastic barrel of claim 1, wherein the tube portion comprises a screw thread.

12. An optical lens assembly, comprising:
a plastic barrel, comprising:
an object-end portion comprising an object-end surface and an object-end hole, wherein the object-end surface comprises a plurality of stepped surfaces disposed coaxially to a central axis, and each of the stepped surfaces comprises a plurality of orthogonal stepped surfaces orthogonal to the central axis;
an image-end portion comprising an image-end opening; and
a tube portion connecting the object-end portion and the image-end portion; and
a lens module disposed in the plastic barrel and comprising a plurality of lens elements;
wherein a diameter of the object-end hole is φo, a sum of the orthogonal stepped surfaces of every of the stepped surfaces is ΣN, and the following conditions are satisfied:

φo<4.5 mm; and

7≤ΣN.

13. The optical lens assembly of claim 12, wherein the plastic barrel is formed by an injection molding method.

14. The optical lens assembly of claim 13, wherein the object-end hole is an aperture stop of the optical lens assembly.

15. The optical lens assembly of claim 12, wherein a distance parallel to the central axis between the object-end hole and the image-end opening is TL, a diameter of the object-end hole is φo, and the following condition is satisfied:

1.35<TL/φo<2.75.

16. The optical lens assembly of claim 15, wherein the distance parallel to the central axis between the object-end hole and the image-end opening is TL, the diameter of the object-end hole is φo, and the following condition is satisfied:

1.50<TL/φo<2.25.

17. The optical lens assembly of claim 13, wherein at least one of the stepped surfaces forms an annular groove, a number of the annular groove is M, and the following condition is satisfied:

1≤M≤8.

18. An imaging apparatus, comprising:
the optical lens assembly of claim 12.

19. An electronic device, comprising:
the imaging apparatus of claim 18.

* * * * *

UNITED STATES PATENT AND TRADEMARK OFFICE
CERTIFICATE OF CORRECTION

PATENT NO.        : 9,753,243 B2
APPLICATION NO.   : 14/828704
DATED             : September 5, 2017
INVENTOR(S)       : Chou It is certified that error appears in the above-identified patent and that said Letters Patent is hereby corrected as shown below:

In Claim 9 (Column 11, Line 59), please delete "1.35 < TL/φo < 2.75.12" and insert therefor: -- 1.35 < TL/φo < 2.75 --

In Claim 10 (Column 12, Line 5), please delete "1.50 < TL/φo < 2.25.14" and insert therefor: -- 1.50 < TL/φo < 2.25 --

In Claim 15 (Column 12, Line 37), please delete "a diameter of the" and insert therefor: -- the diameter of the --

Signed and Sealed this
Twenty-third Day of January, 2018

Joseph Matal
*Performing the Functions and Duties of the
Under Secretary of Commerce for Intellectual Property and
Director of the United States Patent and Trademark Office*